United States Patent
Nakanishi et al.

(10) Patent No.: US 9,266,484 B2
(45) Date of Patent: Feb. 23, 2016

(54) CRUSH BOX

(71) Applicants: Makoto Nakanishi, Toyota (JP);
Kazuaki Kitaguchi, Toyota (JP)

(72) Inventors: Makoto Nakanishi, Toyota (JP);
Kazuaki Kitaguchi, Toyota (JP)

(73) Assignee: Toyoda Iron Works Co., Ltd.,
Toyota-shi, Aichi (JP)

( * ) Notice: Subject to any disclaimer, the term of this patent is extended or adjusted under 35 U.S.C. 154(b) by 0 days.

(21) Appl. No.: 14/283,653

(22) Filed: May 21, 2014

(65) Prior Publication Data

US 2015/0108775 A1 Apr. 23, 2015

(30) Foreign Application Priority Data

Oct. 22, 2013 (JP) .................... 2013-219370

(51) Int. Cl.
*B62D 25/08* (2006.01)
*B62D 25/20* (2006.01)
*B60R 19/34* (2006.01)

(52) U.S. Cl.
CPC ..................... *B60R 19/34* (2013.01)

(58) Field of Classification Search
CPC ....... B60R 19/34; B22F 2998/10; B22F 3/24; B22F 9/22; B22F 3/02; B22F 3/04; B22F 3/10; B22F 3/15; B22F 9/04; B22F 2003/241; B22F 2009/041; B22F 2009/043; B82Y 30/00; B82Y 27/10; B82Y 27/12
USPC ................ 293/133, 132; 296/187.01, 187.03, 296/187.09, 187.1, 193.09
See application file for complete search history.

(56) References Cited

U.S. PATENT DOCUMENTS

| 6,779,821 | B2 * | 8/2004 | Hallergren | 293/133 |
| 7,793,996 | B2 * | 9/2010 | Karlander | 293/133 |
| 7,896,411 | B2 * | 3/2011 | Kano et al. | 293/133 |
| 2008/0030031 | A1 * | 2/2008 | Nilsson | 293/133 |
| 2009/0085362 | A1 * | 4/2009 | Terada et al. | 293/132 |
| 2011/0049916 | A1 * | 3/2011 | Nakanishi | 293/133 |

FOREIGN PATENT DOCUMENTS

JP 2010-76476 4/2010

OTHER PUBLICATIONS

English Language Translation of JP 2010-76476 (Publication Date: Apr. 8, 2010; Applicant: Mazda Motor Corp.).

* cited by examiner

*Primary Examiner* — Glenn Dayoan
*Assistant Examiner* — Sunsurraye Westbrook
(74) *Attorney, Agent, or Firm* — Finnegan, Henderson, Farabow, Garrett & Dunner, LLP

(57) ABSTRACT

A crush box includes a tubular body having a polygonal section and disposed between an end portion of a bumper beam and a vehicle body in such a posture that an axial direction of the tubular body generally coincides with a longitudinal direction of a vehicle, in which the tubular body has an outer side wall and an inner side wall that is located inward of the outer side wall in a vehicle-width direction, and both the outer side wall and the inner side wall are inclined outward in the vehicle-width direction, in a direction from the vehicle body toward the bumper beam, and in which the tubular body is crushed into a bellows shape to absorb impact energy as a compressive load is applied to the tubular body from the bumper beam in the axial direction of the tubular body, wherein an angle of inclination of the outer side wall is greater than an angle of inclination of the inner side wall.

4 Claims, 14 Drawing Sheets

FIG.9
《SHORT OVERLAP, 64km》
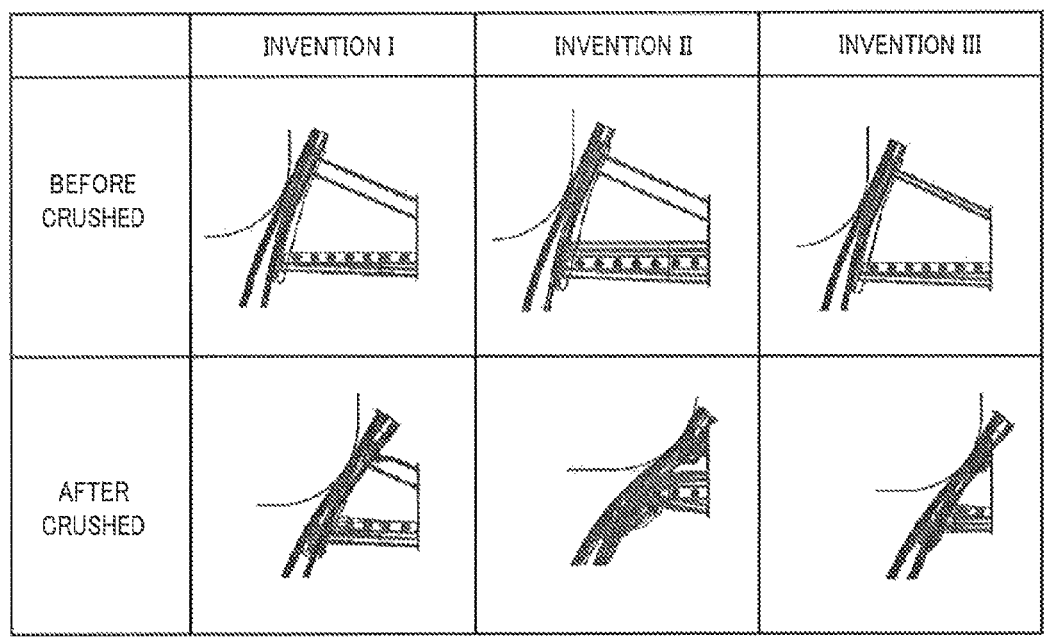
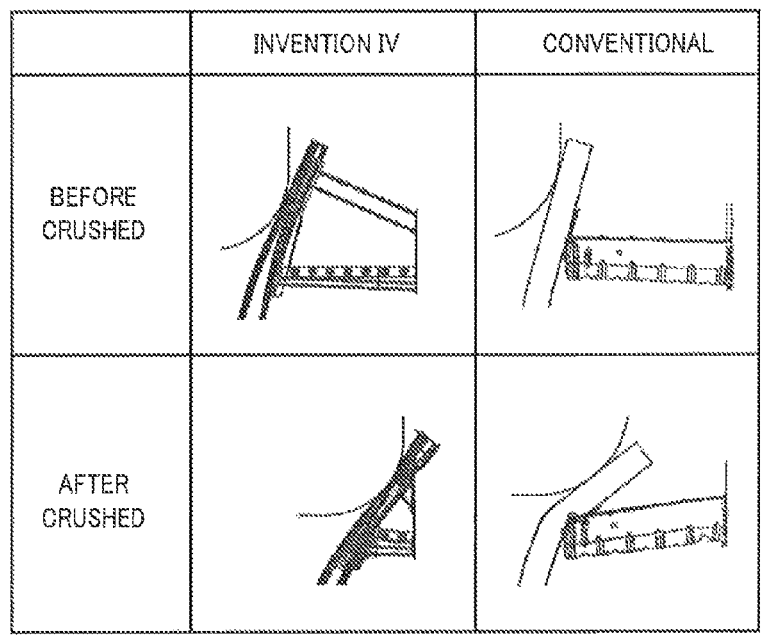

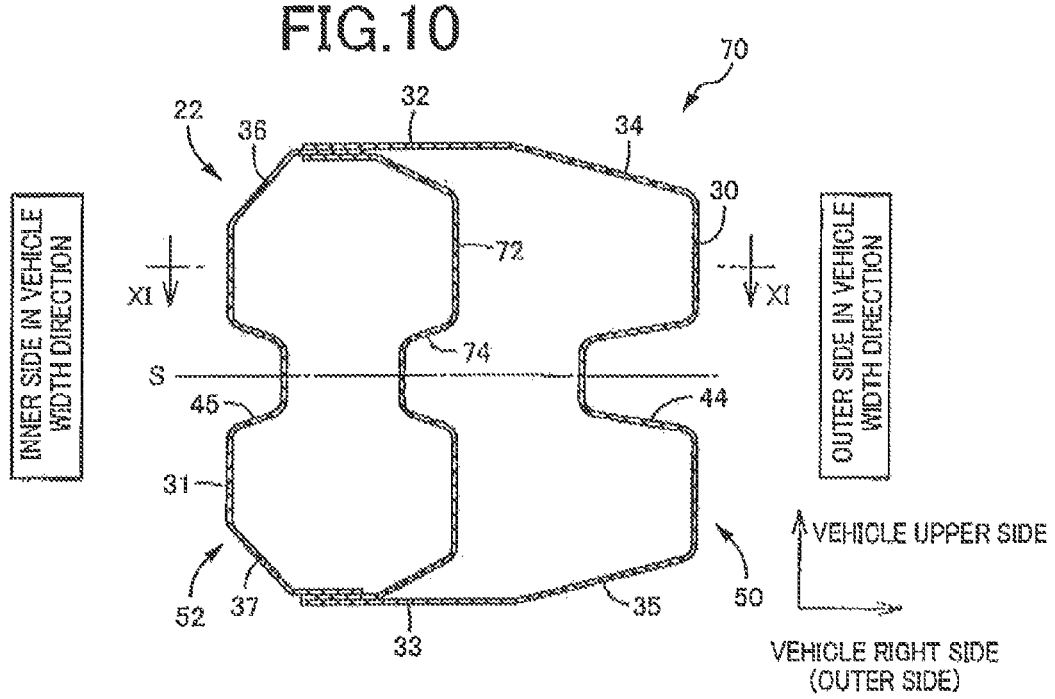
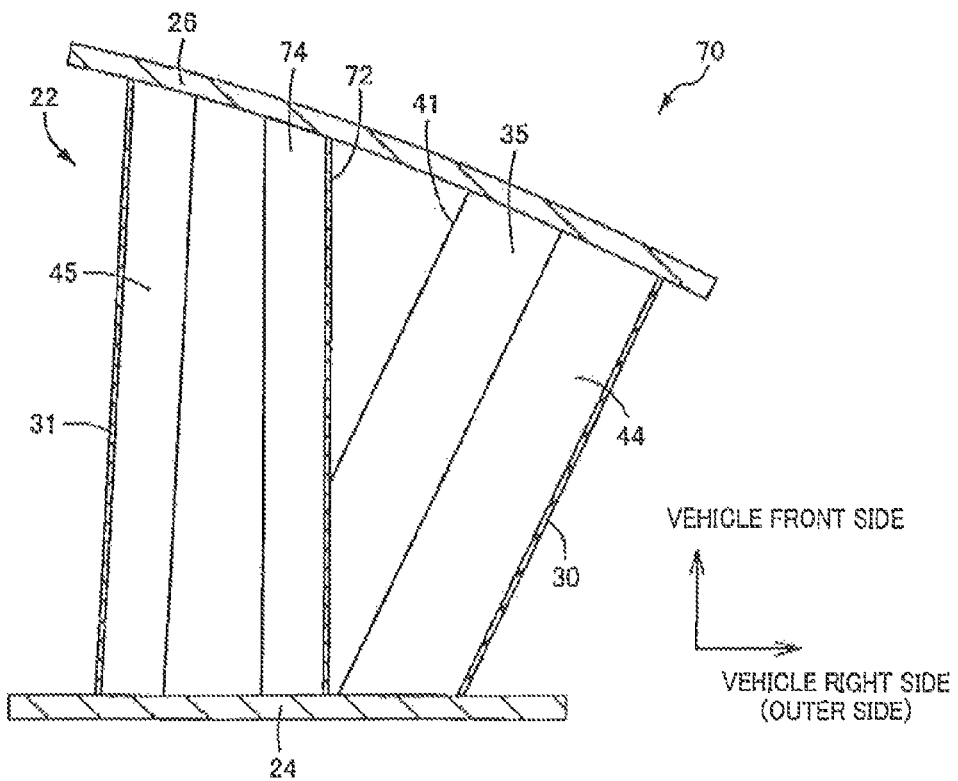

FIG.19
《40%OVERLAP, 16km》
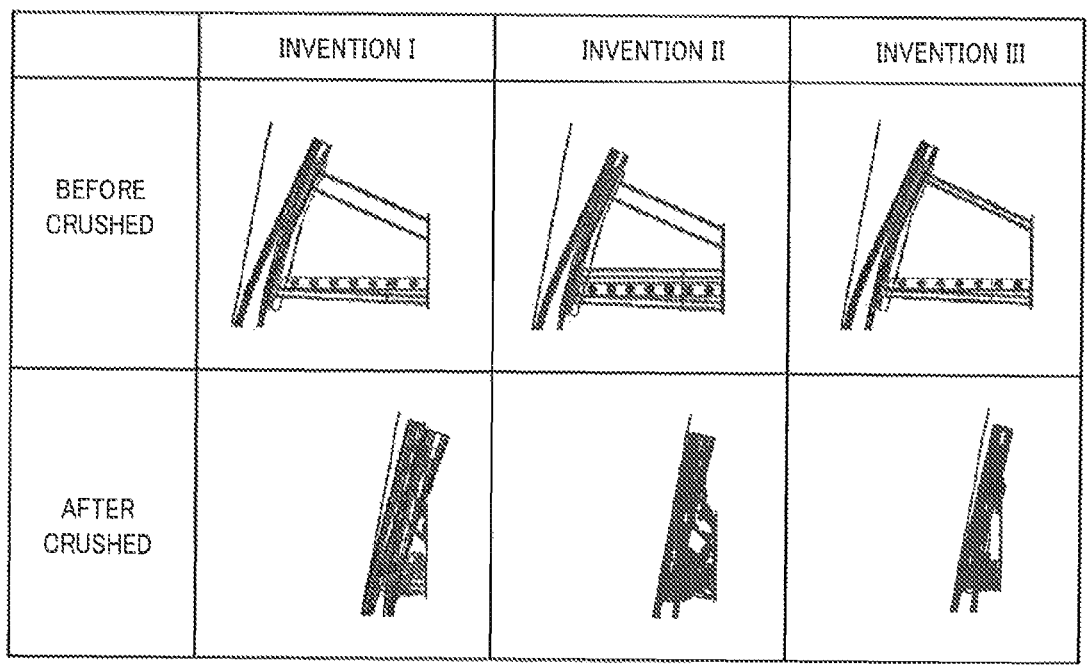
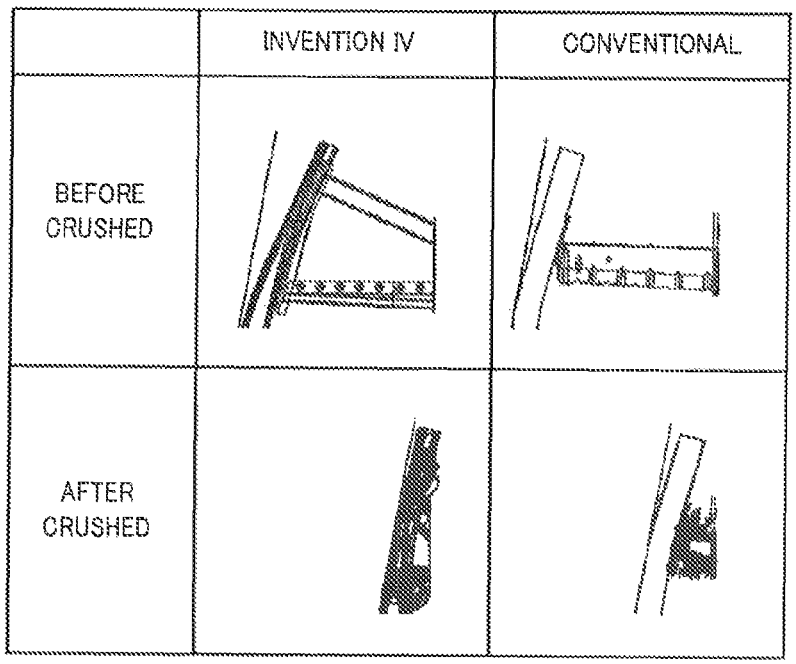

FIG.22
⟨FRONTAL COLLISION, 55km⟩
| | INVENTION I | INVENTION II | INVENTION III |
|---|---|---|---|
| BEFORE CRUSHED | 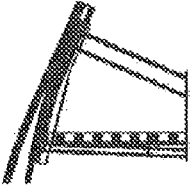 | 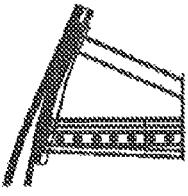 | 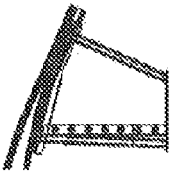 |
| AFTER CRUSHED |  |  |  |
| | INVENTION IV | CONVENTIONAL |
|---|---|---|
| BEFORE CRUSHED | 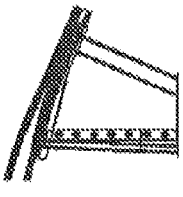 | 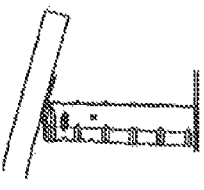 |
| AFTER CRUSHED |  |  |

CRUSH BOX

INCORPORATION BY REFERENCE

The disclosure of Japanese Patent Application No. 2013-219370 filed on Oct. 22, 2013 including the specification, drawings and abstract is incorporated herein by reference in its entirety.

BACKGROUND OF THE INVENTION

1. Field of the Invention

The invention relates generally to a crush box, and more specifically to a technique for preventing a crush box from being displaced to tilt laterally at the time of a short overlap offset collision.

2. Description of the Related Art

There has been proposed a crush box (a) that includes a tubular body having a polygonal section and disposed between an end portion of a bumper beam and a vehicle body in such a posture that the axial direction of the tubular body generally coincides with the longitudinal direction of a vehicle, (b) in which the tubular body has an outer side wall and an inner side wall that is located inward of the outer side wall in the vehicle-width direction, and both the outer side wall and the inner side wall are inclined outward in the vehicle-width direction (i.e., the distance between a line extending in the vehicle longitudinal direction and each of the outer side wall and the inner side wall increases in a direction from the vehicle body toward the bumper beam), and (c) in which the tubular body is crushed into a bellows shape to absorb impact energy as a compressive load is applied to the tubular body from the bumper beam in the axial direction of the tubular body. A crush box described in Japanese Patent Application Publication No. 2010-76476 (JP 2010-76476 A) is an example of the above-described crush box. According to JP 2010-76476 A, a tubular body of the crush box is inclined outward in the vehicle-width direction, and thus the crush box is restrained from being displaced to tilt inward in the vehicle-width direction.

However, in the event of an offset collision, for example, as illustrated in FIG. 5, even the crush box inclined outward in the vehicle-width direction is likely to be displaced to tilt laterally and thus the impact energy absorption performance of the crush box may be lowered. For example, in the case of a short overlap collision between a collision barrier and a bumper beam, that is, a collision with a short (small) overlap between the collision barrier and the bumper beam, as illustrated in a section of a conventional crush box in FIG. 9, an end portion of the bumper beam, which is located outward of the crush box in the vehicle-width direction, undergoes bending deformation and the crush box itself is displaced to tilt inward in the vehicle-width direction from its root (its end portion on the vehicle body side), so that the crush box is not crushed into a bellows shape. As a result, the impact energy absorption performance is significantly lowered. FIG. 9 illustrates the conventional crush box that is disposed so as to extend substantially parallel to the vehicle longitudinal direction as illustrated in FIG. 15. However, even in the case where a crush box inclined outward in the vehicle-width direction as described in JP 2010-76476 A is adopted, a similar problem may occur depending on an angle of inclination of the crush box. If the angle of inclination of the crush box is increased, occurrence of the above-described problem may be reduced but the crush box is more likely to be displaced to tilt outward in the vehicle-width direction. Therefore, it is difficult to select the angle of inclination at which the crush box is disposed to tilt neither inward nor outward in the vehicle-width direction in the event of a short overlap collision.

SUMMARY OF THE INVENTION

The invention is made in light of the above-described circumstances, and one object of the invention is to allow a crush box to stably deliver prescribed impact energy absorption performance in the event of various kinds of collisions including a short overlap offset collision.

Means for Solving the Problem

To achieve the object, the first aspect of the invention provides a crush box (a) that includes a tubular body having a polygonal section and disposed between an end portion of a bumper beam and a vehicle body in such a posture that an axial direction of the tubular body generally coincides with a longitudinal direction of a vehicle, (b) in which the tubular body has an outer side wall and an inner side wall that is located inward of the outer side wall in a vehicle-width direction, and both the outer side wall and the inner side wall are inclined outward in the vehicle-width direction, in a direction from the vehicle body toward the bumper beam, and (c) in which the tubular body is crushed into a bellows shape to absorb impact energy as a compressive load is applied to the tubular body from the bumper beam in the axial direction of the tubular body, (d) wherein an angle of inclination of the outer side wall is greater than an angle of inclination of the inner side wall.

The second aspect of the invention provides the crush box recited in the first aspect of the invention, wherein (a) the tubular body has an octagonal shape in a section perpendicular to the longitudinal direction of the vehicle; the tubular body has an upper side wall and a lower side wall in addition to the outer side wall and the inner side wall; an outer inclined side wall is disposed between the upper side wall and the outer side wall, and an outer inclined side wall is disposed between the lower side wall and the outer side wall; an inner inclined side wall is disposed between the upper side wall and the inner side wall, and an inner inclined side wall is disposed between the lower side wall and the inner side wall; and (b) each of the outer inclined side walls is formed to have a constant width so that a ridge line between the upper side wall and a corresponding one of the outer inclined side walls and a ridge line between the lower side wall and a corresponding one of the outer inclined side walls are parallel to the outer side wall in a planer view as viewed from an up-down direction of the crush box.

The third aspect of the invention provides the crush box recited in the first or the second aspect of the invention, wherein: grooves that are recessed toward an inside of the tubular body are respectively formed in the outer side wall and the inner side wall so as to extend in the axial direction of the tubular body; and a depth of the groove of the outer side wall is greater than a depth of the groove of the inner side wall.

The fourth aspect of the invention provides the crush box recited in any one of the first to the third aspects of the invention, wherein: (a) the end portion of the bumper beam is inclined so as to approach the vehicle body; and (b) at least part of a bumper beam-side end portion of the tubular body is inclined so as to be attached to the inclined end portion of the bumper-beam.

Effects of the Invention

In the crush box, the angle of inclination of the outer side wall is greater than the angle of inclination of the inner side wall, and thus a width of the crush box increases so as to be widened outward in the vehicle-width direction, in the direction toward the bumper beam. Thus, bending deformation of the end portion of the bumper beam is suppressed even in the event of a short overlap offset collision. As a result, the crush box is restrained from being displaced to tilt laterally and the tubular body is crushed into a bellows shape, so that appropriate impact energy absorption performance is obtained, Because the angle of inclination of the inner side wall is small and thus the attachment width along which the crush box is attached to the bumper beam is large, the possibility that each of the crush box will be displaced to tilt outward in the vehicle-width direction is lowered. As a result, the tubular body is restrained from being displaced to tilt laterally in the event of various kinds of collisions, and prescribed impact energy absorption performance is stably obtained. The attachment width along which the crush box is attached to the vehicle body is smaller than the attachment width along which the crush box is attached to the bumper beam. Thus, an increase in weight of the crush box is smaller than that when the width of tubular body is increased over the entire length of the tubular body. Further, it is possible to attach the crush box to members such as a side member on the vehicle body side without the need to change the members. Thus, the crush box is easily applicable to conventional vehicles.

The second aspect of the invention is the case where the tubular body has an octagonal section and each of the outer inclined side walls is formed to have a constant width so that the ridge lines between the outer inclined side walls and the upper and lower side wall are parallel to the outer side wall. Thus, the width of each of the upper side wall and the lower side wall increases in the direction toward the bumper beam in accordance with the inclination of the outer side wall outward in the vehicle-width direction. With this configuration, appropriate strength is obtained in spite of the large inclination of the outer side wall, and the impact energy absorption performance is improved.

The third aspect of the invention is the case where the grooves are respectively formed in the outer side wall and the inner side wall; and the depth of the groove of the outer side wall is greater than the depth of the groove of the inner side wall. Thus, the buckling strength of the outer side wall increases, and appropriate impact energy absorption performance is obtained in spite of the large inclination.

The fourth aspect of the invention is the case where the end portion of the bumper beam is inclined so as to approach the vehicle body; and the tubular body is attached to the inclined end portion of the bumper beam. The invention is suitably applied.

BRIEF DESCRIPTION OF THE DRAWINGS

FIG. 9 illustrates comparison between the shapes of each of the crush boxes before and after a crush by the offset collision test in FIG. 5.

FIG. 10 illustrates the invented crush box II which was used in the offset collision test shown in FIG. 5 and is a sectional view corresponding to FIG. 3.

FIG. 11 is a sectional view taken along the line XI-XI indicated by arrows in FIG. 10.

FIG. 19 illustrates comparison between the shapes of each of the crush boxes before and after a crush by the offset collision test in FIG. 17

FIG. 22 illustrates comparison between the shapes of each of the test parts before and after a crush by the frontal collision test in FIG. 20

Figure 1:
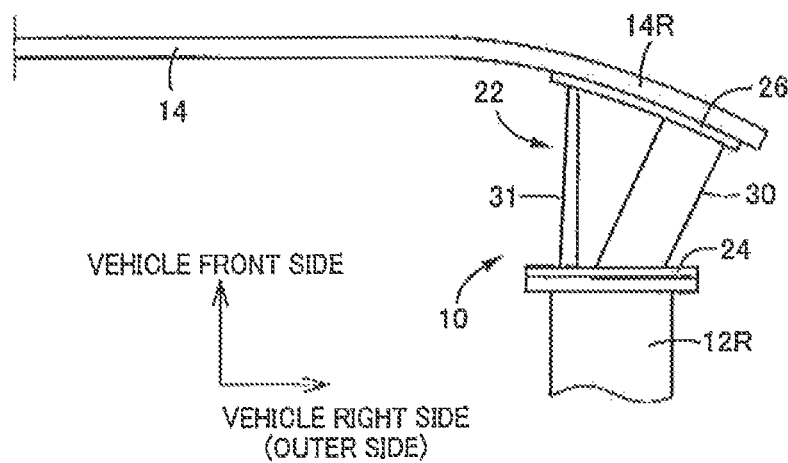
FIG. 1 is a schematic plan view for explaining a crush box that is an embodiment of the present invention, and is an example of the arrangement.

The crush box according to the invention is applicable to an attachment portion of a bumper beam attached to the vehicle front side and an attachment portion of a bumper beam attached to the vehicle rear side. However, the crush box according to the invention may be applied to one of the attachment portion of the bumper beam attached to the vehicle front side and the attachment portion of the bumper beam attached to the vehicle rear side. Further, the crush box may be applied to one of the attachment portions on the right and left end portions of a bumper beam. The crush box is disposed in such a posture that the axial direction of the tubular body generally coincides with the longitudinal direction of the vehicle, and the crush box is inclined toward in the vehicle-width direction it a planar view as viewed from above. However, the crush box may be horizontal in the vehicle longitudinal direction or may be inclined in the up-down direction in a side view as viewed from the side of the crush box. The crush box may have a constant height (the size in the up-down dimension) in a side view. Alternatively, the crush box may have a tapered shape so that the height thereof linearly increases or decreases in a direction toward the bumper beam.

The crush box includes, in addition to the tubular body, a pair of attachment plates which are fixedly fitted to, for example, respective axial ends of the tubular body. As the tubular body, for example, a tubular body having an octagonal section is preferably used. However, tubular bodies having polygonal sections other than an octagonal section, such as quadrangular sections, for example, a rectangular section and a square section, and a hexagonal section, may be adopted. As long as the section of the tubular body is a polygonal shape as a whole, the corners (ridge line portion) thereof may have a curved shape such as an arc shape. The grooves recessed toward the inside of the tubular body having a polygonal section are formed in the tubular body so as to extend in the axial direction of the tubular body, as necessary. However, the number of the grooves is set as needed, and a plurality of grooves may be formed in one side wall. In the third aspect of the invention, the grooves are formed respectively in the outer side wall and the inner side wall. Alternatively, grooves may be formed in the upper and lower side walls. The groove may have various sectional shapes such as a V-shape, a U-shape, a semi-arc shape, a rectangular shape, and a trapezoidal shape. The multiple grooves may have the same depth, or may have different depths. The depth of the groove may be, for example, linearly changed in the axial direction of the tubular body.

The tubular body may be formed of a pair of halves. Alternatively, the tubular body may be formed of a thin-walled metal pipe, fiber-reinforced plastic, or the like, as a single-piece member. Further alternatively, the tubular body may be formed by bending one metal plate into a prescribed polygonal shape in section, overlapping both end edge portions of the metal plate with each other, and integrating the both end edge portions of the metal plate. That is, the tubular body may be formed in various methods.

The angle of inclination of the outer side wall is preferably within a range of, for example, approximately 10° to approximately 30°, and more preferably within a range of approximately 15° to approximately 25°. If the angle of inclination of the outer side wall is greater than 30°, the outer side wall is likely to be displaced to tilt outward in the vehicle-width direction from its root (its end portion on the vehicle body side) in the event of a frontal collision or the like. The angle of inclination of the inner side wall is preferably greater than 0° and equal to or smaller than 10°, for example. The difference between the angle of inclination of the outer side wall and the angle of inclination of the inner side wall is preferably equal to or greater than 5°, and more preferably equal to or greater than 10°.

When the tubular body has an octagonal section, each of the outer inclined side walls is formed to have a substantially constant width in the vehicle longitudinal direction regardless of the inclination of the outer side wall, so that the ridge lines between the outer inclined side walls and the upper and lower side walls are substantially parallel to the outer side wall in a planar view as viewed from the up-down direction. Alternatively, the width of each of the outer inclined side walls may be linearly increased in a direction toward the bumper beam, so that the width of each of the upper side wall and the lower side wall is substantially constant.

The end portion of the bumper beam is inclined linearly or in a curved shape so as to approach the vehicle body, and a bumper beam-side end portion of the tubular body is partially or entirely inclined so as to be attached to the inclined end portion of the bumper beam. However, the shape of the bumper beam may be set as needed. For example, a linear bumper beam that is substantially perpendicular to the vehicle longitudinal direction may be adopted. The shape of the bumper beam-side end portion of the tubular body is set as needed so that the bumper beam-side end portion is in substantially close contact with an attachment portion of the bumper beam.

If necessary, an intermediate wall that partitions the inner space into multiple spaces may be disposed in the tubular body so as to extend in the axial direction of the tubular body. The intermediate wall is disposed preferably over the entire length of the tubular body. For example, the intermediate wall is disposed so as to connect the upper side wall and the lower side wall to each other. Alternatively, the intermediate wall may be disposed so as to connect the outer side wall and the inner side wall to each other. In addition, a reinforcing member such as a flange may be disposed on the outer side of the tubular body integrally. In this case, the tubular body and the reinforcing member may be a single-piece member, or may be separate members.

DETAILED DESCRIPTION OF EMBODIMENTS

Hereinafter, an embodiment of the invention will be described in detail with reference to the accompanying drawings. FIG. 1 is a schematic plan view of the configuration near a bumper beam 14 disposed on the front side of a vehicle, as viewed from above the vehicle. A crush box 10 is disposed between a side member 12R and a right end portion 14R of the bumper beam 14. FIG. 1 is a plan view illustrating the right half of the vehicle. The left half of the vehicle has a configuration symmetrical to that of the right half of the vehicle with respect to the center line of the vehicle. The right end portion 14R of the bumper beam 14 is inclined so as to be smoothly curved toward a vehicle body in the plan view illustrated in FIG. 1, and the crush box 10 is fixed to the curved-and-inclined right end portion 14R. The crush box 10 includes a hollow tubular body 22 formed of a plurality of flat plate-shaped side walls and having a polygonal section, and a pair of attachment plates 24, 26 that are integrally fixed by welding to respective axial end portions of the tubular body 22. The crush box 10 is disposed between the side member 12R and the bumper beam 14 in such a posture that the axial direction of the tubular body 22 generally coincides with the vehicle longitudinal direction, more specifically, in such a posture that the tubular body 22 is inclined with respect to the vehicle longitudinal direction outward in the vehicle-width direction. Then, the crush box 10 is fixedly fitted at the attachment plates 24, 26 respectively to the side member 12R and the bumper beam 14 with bolts or the like (not illustrated). The attachment plate 26 is curved so as to conform to the curved-and-inclined shape of the right end portion 14R of the bumper beam 14. The side member 12R corresponds to the vehicle body.

Figure 2:
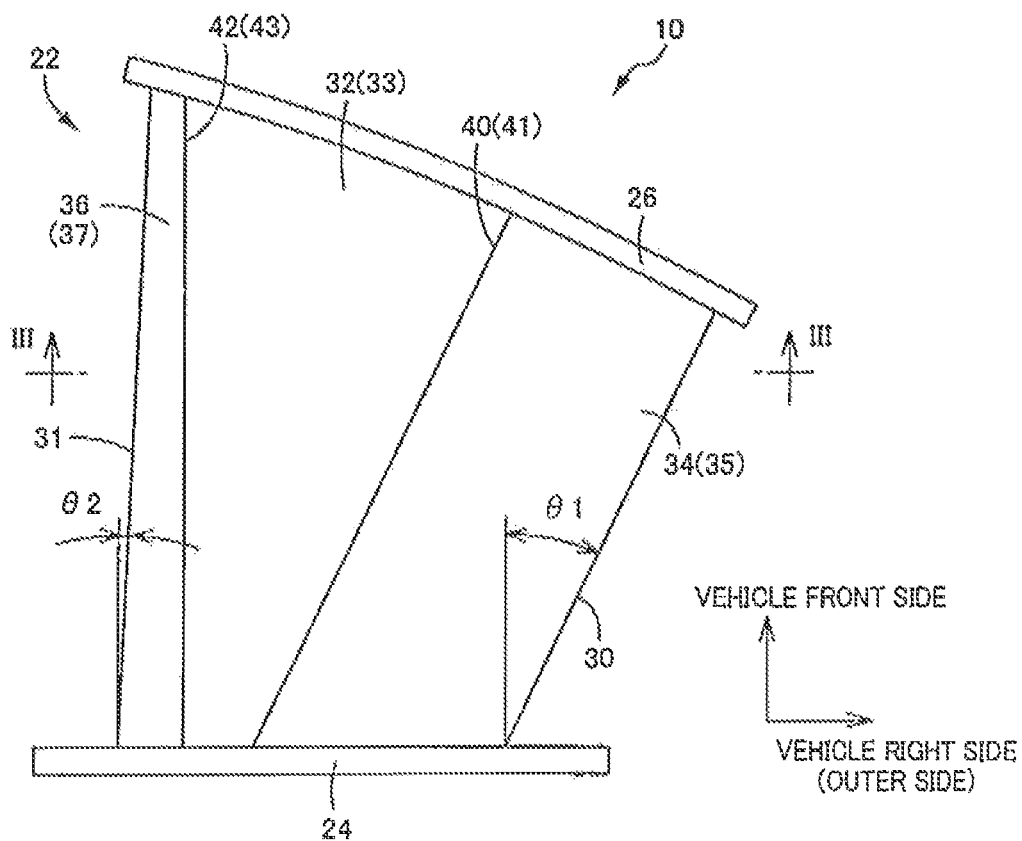
FIG. 2 is a plan view illustrating the crush box alone corresponding to FIG. 1.
Figure 3:
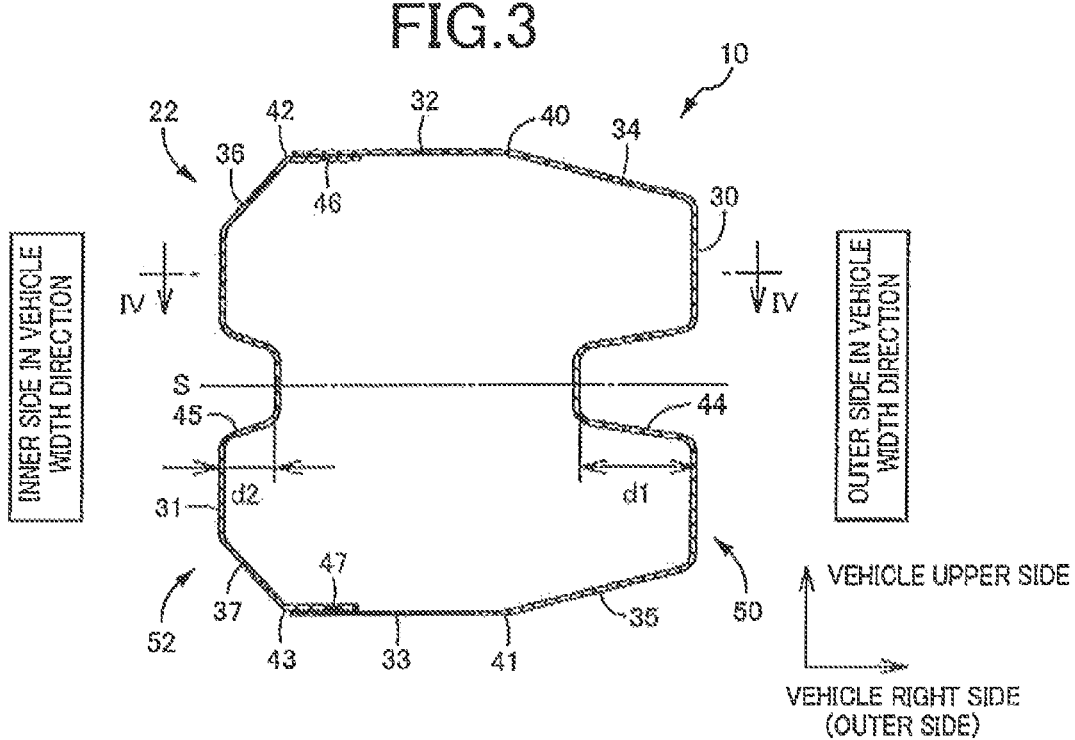
FIG. 3 is a sectional view of the crush box in FIG. 2 taken along the line III-III indicated by arrows in FIG. 2.
Figure 4:
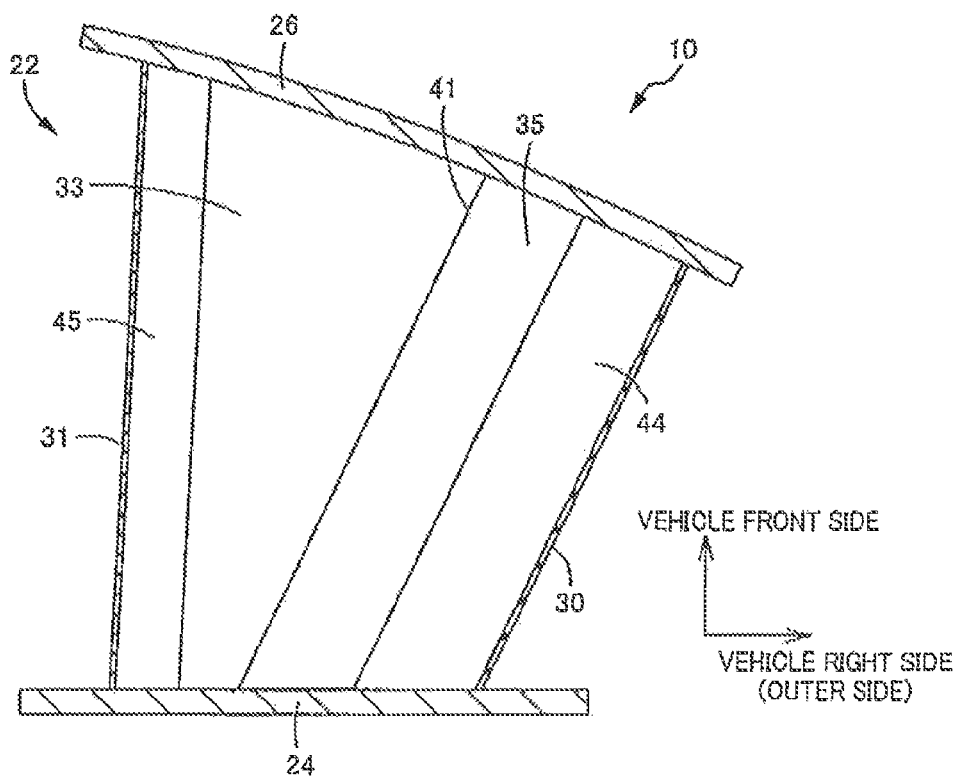
FIG. 4 is a sectional view taken along the line IV-IV indicated by arrows in FIG. 3.

FIG. 2 to FIG. 4 are views illustrating the crush box 10 alone. FIG. 2 is a plan view corresponding to FIG. 1. FIG. 3 is a sectional view taken along the line II-III indicated by arrows in FIG. 2. FIG. 4 is a sectional view taken along the line IV-IV indicated by arrows in FIG. 3. Axial end edges of the tubular body 22 are respectively in substantially close contact with the attachment plates 24, 26, over the whole circumference of the end edges, and are integrally fixed to the attachment plates 24, 26 by arc welding or the like. When an impact is applied to the crush box 10 from the vehicle front side and the crush box 10 receives a compressive load in its axial direction, the tubular body 22 is crushed into a bellows shape and impact energy is absorbed through the deformation of the tubular body 22, so that an impact to be applied to structural members of the vehicle, such as the side member 12R, is buffered. The crush of the tubular body 22 into a bellows shape is a phenomenon that is caused as the tubular body 22 is successively buckled (bent into a V-shape) at its multiple portions in the axial direction. Usually, the buckling of the tubular body 22 is started from the bumper beam 14 side, that is, the impact reception side, and proceeds toward the vehicle body side over time. The bumper beam 14 functions as a reinforcement (reinforcing member) and attachment member of a bumper, and a bumper fascia (not illustrated) made of a synthetic resin or the like is fixedly fitted to the bumper beam 14.

The basic sectional shape of the tubular body 22 is a polygonal shape, more specifically, an octagon shape formed by chamfering four corners of a rectangular. The tubular body 22 has; a pair of an outer side wall 30 and an inner side wall 31 that extend substantially vertically and that are arranged so that the outer side wall 30 is located outward of the inner side wall 31 in the vehicle-width direction; a pair of an upper side wall 32 and a lower side wall 33 that extend substantially horizontally and that are arranged so that the upper side wall 32 is located above the lower side wall 33 in the vehicle-height direction; outer inclined side walls 34, 35 that are respectively disposed between the upper and lower side walls 32, 33 and the outer side wall 30; and inner inclined side walls 36, 37 that are respectively disposed between the upper and lower side walls 32, 33 and the inner side wall 31. Both the outer side wall 30 and the inner side wall 31 are inclined outward in the vehicle-width direction (i.e., the distance between a line extending in the vehicle longitudinal direction and each of the outer side wall 30 and the inner side wall 31 increases) in a direction toward the attachment plate 26 located on the bumper beam 14 side. An angle of inclination θ1 of the outer side wall 30 is greater than an angle of inclination θ2 of the inner side wall 31. In the present embodiment, $θ1 \approx 24°$, $θ2 \approx 2.5°$, and the difference between θ1 and θ2 is approximately 21.5°. Each of the angles of inclination θ1, θ2 is an angle of inclination with respect to line extending in the vehicle longitudinal direction in a planar view.

The outer inclined side walls 34, 35 are formed to have a substantially constant width such that ridge lines 40, 41 between the outer inclined side walls 34, 35 and the upper and lower side walls 32, 33 are parallel to the outer side wall 30 in a planar view in which the crush box is viewed from the up-down direction. The width of each of the upper side wall 32 and the lower side wall 33 is increased in a direction toward the bumper beam 14 in accordance with the inclination of the outer side wall 30. The width of each of the inner inclined side walls 36, 37 is decreased in the direction toward the bumper beam 14 such that ridge lines 42, 43 between inner inclined side walls 36, 37 and the upper and lower side walls 32, 33 are parallel to the line extending in the vehicle longitudinal direction in a planar view in which the crush box 10 is viewed in the up-down direction. In addition, a pair of grooves 44, 45, which are recessed toward the inside of the tubular body 22, are formed at central portions of the outer side wall 30 located on the right side and the inner side wall 31 located on the left side in their height direction, that is, at portions on a horizontal axis S that passes through the center in the up-down direction in FIG. 3. Each of the grooves 44, 45 has a trapezoidal section of which the width decreases toward its distal end, that is, toward its groove bottom. The grooves 44, 45 respectively have constant depths d1, d2 over the entire axial length of the tubular body 22. The depth d1 of the groove 44 is greater than the depth d2 of the groove 45. For example, $d1 \approx 30$ mm, and $d2 \approx 14$ mm.

The tubular body 22 is splittable into two pieces at the positions near the ridge lines 42, 43, and the two pieces are a pair of halves 50, 52 each of which are formed by press working. Specifically, the outer half 50 located outward of the inner half 52 in the vehicle-width direction is a single-piece member having: the outer side wall 30 in which the groove 44 is formed; the pair of outer inclined side walls 34, 35 that obliquely extend respectively from upper and lower ends of the outer side wall 30 inward in the vehicle-width direction; and the upper side wall 32 and the lower side wall 33 that horizontally extend respectively from end portions of the pair of outer inclined side walls 34, 35. Similarly, the inner half 52 located inward of the outer half 50 in the vehicle-width direction is a single-piece member having; the inner side wall 31 in which the groove 45 is formed; and the pair of inner inclined side walls 36, 37 that obliquely extend respectively from upper and lower ends of the inner side wall 31 outward in the vehicle-width direction. Joint portions 46, 47 that are respectively overlapped with the inner sides of the upper side wall 32 and the lower side wall 33 of the outer half 50 are formed at distal ends of the inner inclined side walls 36, 37 of the inner half 52. The joint portions 46, 47 are respectively integrated with the inner sides of the upper side wall 32 and the lower side wall 33 by spot welding, arc welding, or the like.

Figure 5:
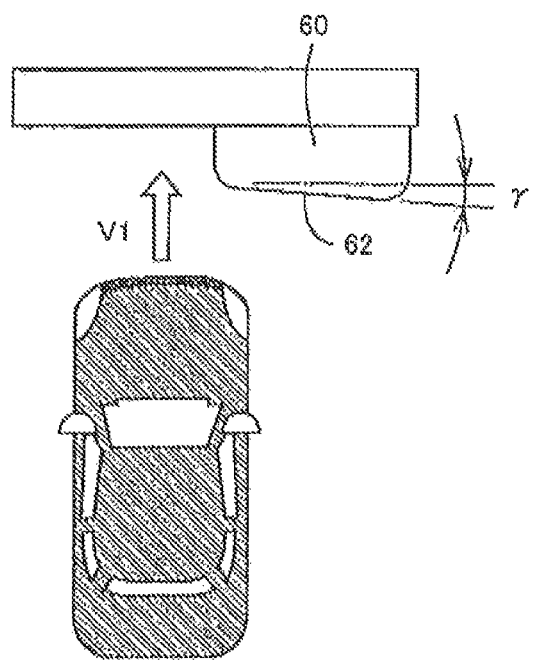
FIG. 5 is a plan view illustrating an offset collision test with the short (small) overlap between the vehicle and a collision barrier.
Figure 6:
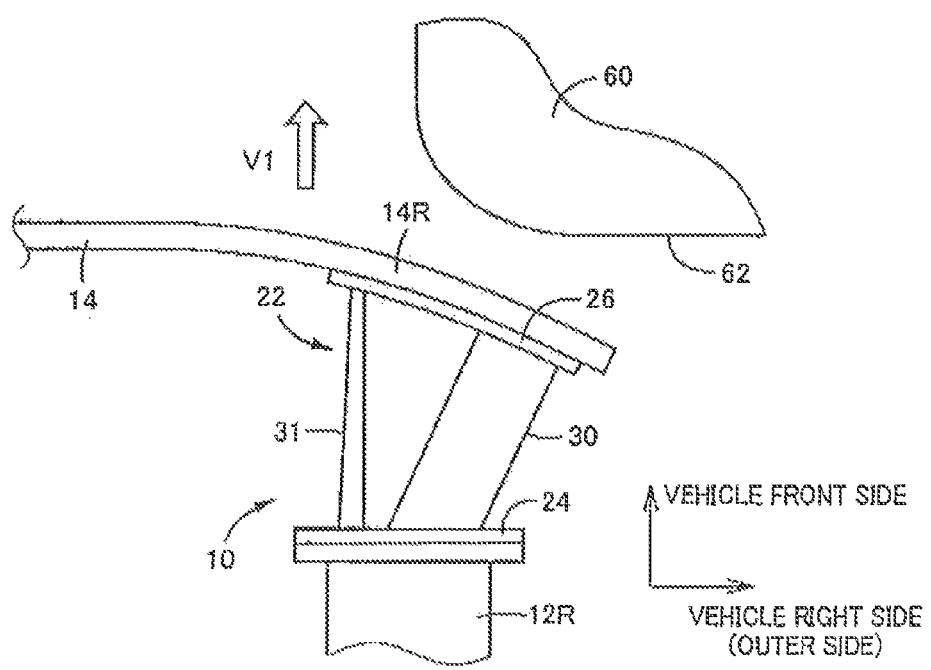
FIG. 6 is a plan view illustrating a location of the crush box and the collision barrier at the offset collision test in FIG. 5.
Figure 7:
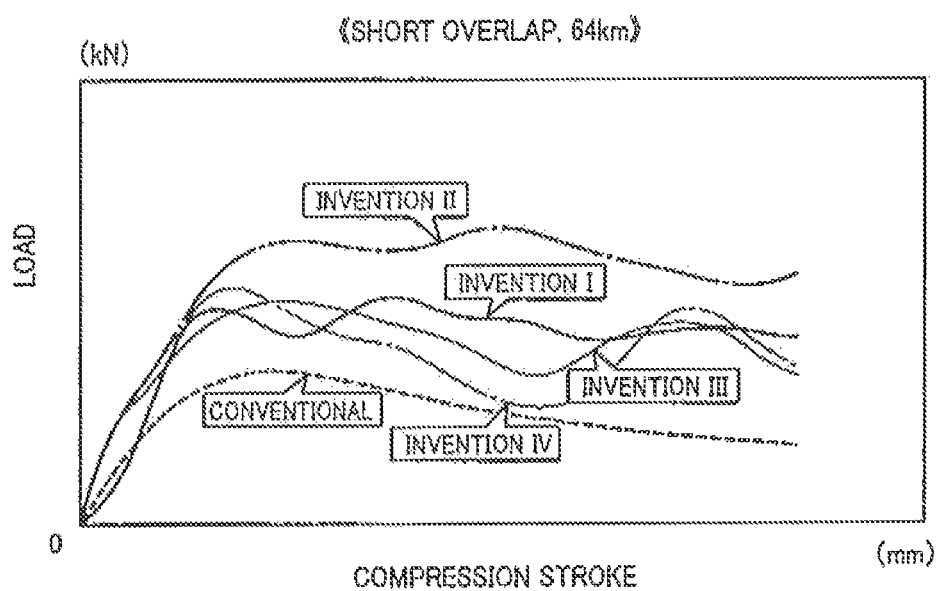
FIG. 7 illustrates load variation characteristics with respect to a compression stroke, which were obtained through FEM analyses for the invented crush boxes and a conventional crush box after conducting the offset collision test
Figure 8:
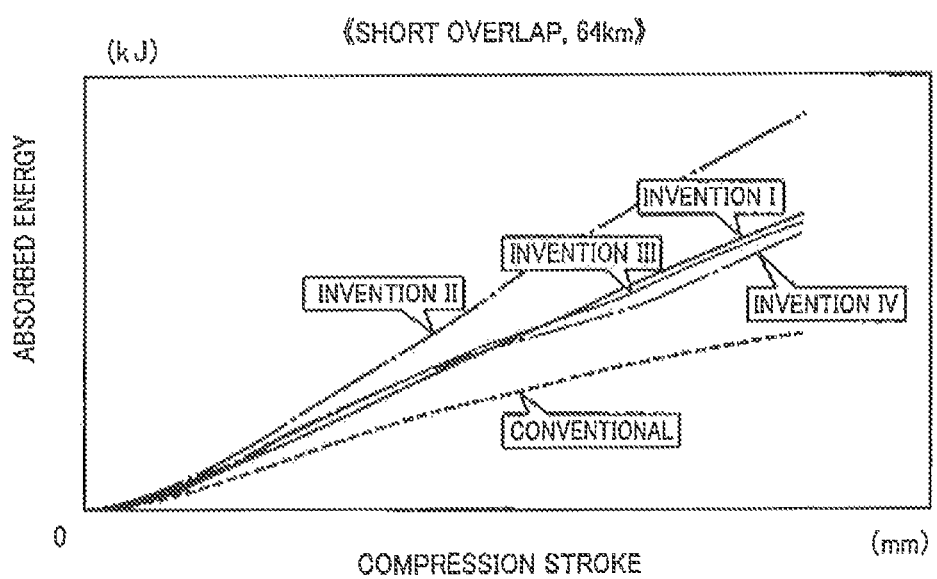
FIG. 8 illustrates energy absorption characteristics which were obtained through the load variation characteristics in FIG. 7.

A total of five kinds of test parts including crush boxes I to IV according to the invention (hereinafter, referred to as "the invented crush boxes I to IV) and a conventional crush box was prepared. Then, offset collision tests in which the right front portion of a vehicle is made to collide with a collision barrier 60 having a collision face 62 with a barrier angle γ at a vehicle speed V1 were conducted as illustrated in FIG. 5, FIG. 7 and FIG. 8 illustrate load variation characteristics and energy absorption characteristics with respect to a compression stroke, which were obtained through FEM analyses. In this offset collision, as illustrated in FIG. 6, the collision barrier 60 collided with part of the crush box 10 with a short (small) overlap (25% overlap) between the collision barrier 60 and the bumper beam 14. The barrier angle γ was approximately 0° ($γ \approx 0°$), and the vehicle speed V1 was approximately 64 km/h ($V1 \approx 64$ km/h). FIG. 5 and FIG. 6 are plan views illustrating the offset collision test as viewed from above. FIG. 9 is a table illustrating comparison between the shapes of each of the test parts before and after a crush.

Figure 12:
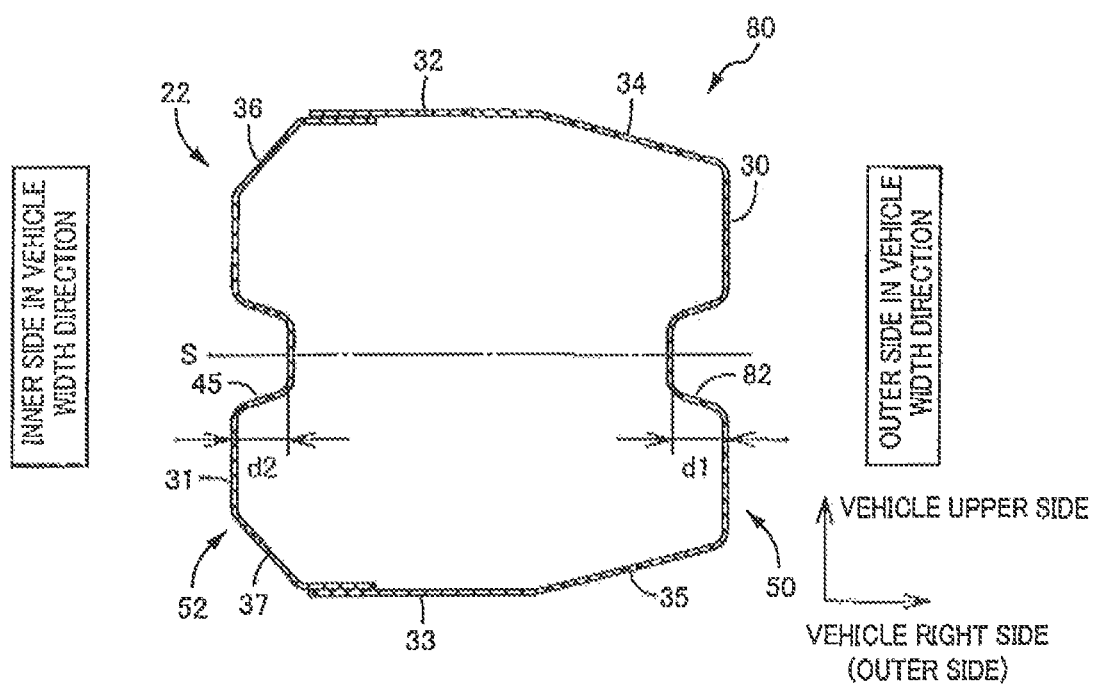
FIG. 12 illustrates the invented crush box III which was used in the offset collision test shown in FIG. 5 and is a sectional view corresponding to FIG. 3.
Figure 13:
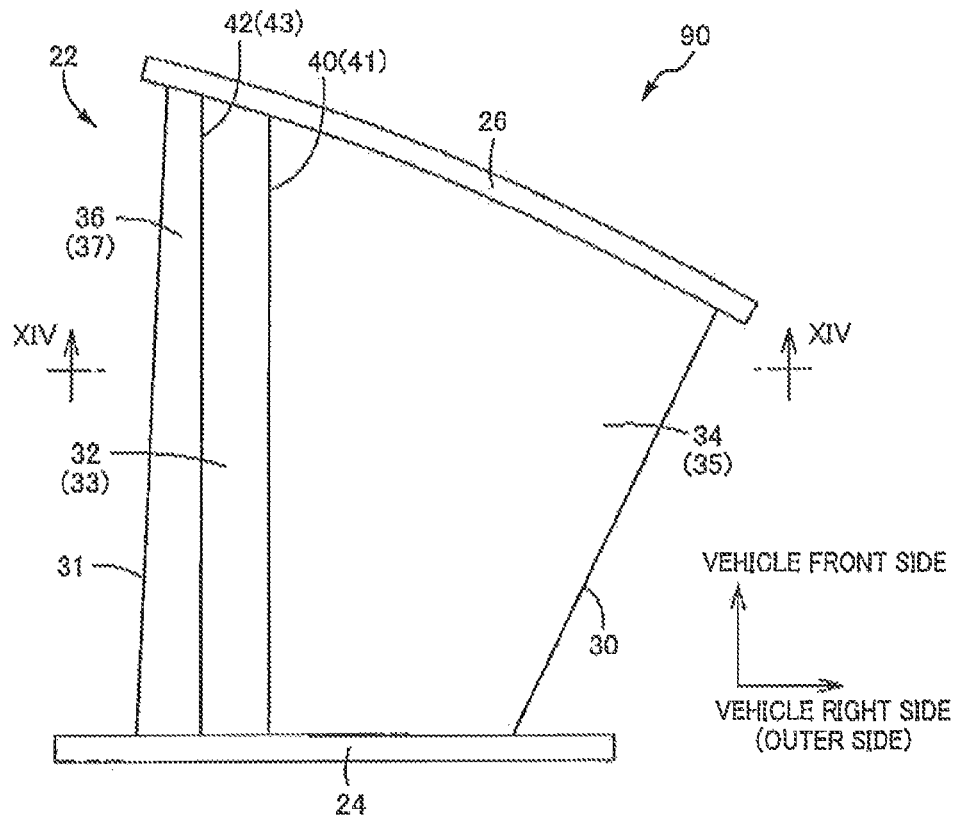
FIG. 13 illustrates the invented crush box IV which was used in the offset collision test shown in FIG. 5 and is a plan view corresponding to FIG. 2.
Figure 14:
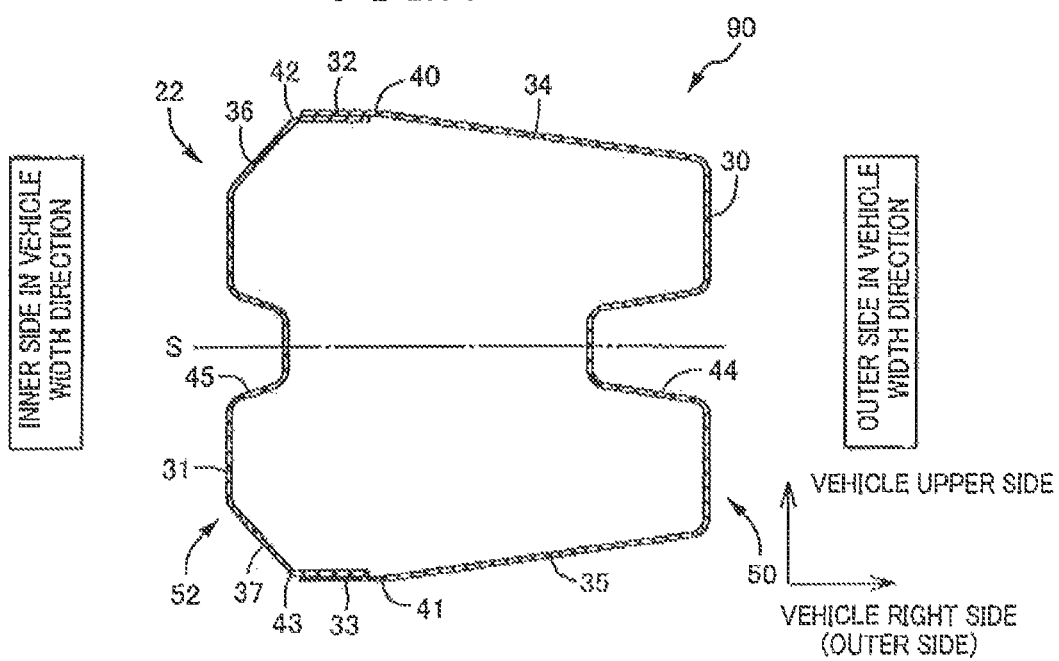
FIG. 14 is a sectional view taken along the line XIV-XIV indicated by arrows in FIG. 13.

The invented crush box I is the crush box 10 according to the embodiment described above, and the invented crush box II is a crush box 70 illustrated in FIG. 10 and FIG. 11. In the crush box 70, an intermediate wall 72 that connects an upper side wall 32 and a lower side wall 33 to each other is disposed so as to extend parallel to the vehicle longitudinal direction, over the entire axial length of a tubular body 22, so that the inner space of the tubular body 22 is partitioned into two spaces by the intermediate wall 72. A groove 74 is formed in the intermediate wall 72 so as to be substantially symmetrical to the groove 45. FIG. 10 is a sectional view corresponding to FIG. 3. FIG. 11 is a sectional view taken along the line XI-XI indicated by arrows in FIG. 10. The invented crush box III is a crush box 80 illustrated in FIG. 12. The crush box 80 differs from the crush box 10 in that a depth d1 of a groove 82 formed in an outer side wall 30 is substantially equal to a depth d2 of a groove 45 located on the opposite side of a tubular body 22 from the groove 82. FIG. 12 is a sectional view corresponding to FIG. 3. The invented crush box IV is a crush box 90 illustrated in FIG. 13 and FIG. 14. The crush box 90 differs from the crush box 10 in that ridge lines 40, 41 are respectively parallel to ridge lines 42, 43, that is, parallel to the vehicle longitudinal direction, an upper side wall 32 and a lower side wall 33 each have a constant width, and the width of each of outer inclined side walls 34, 35 is increased in a direction toward an attachment plate 26 located on a bumper beam 14 side in accordance with the inclination of an outer side wall 30. FIG. 13 is a plan view corresponding to FIG. 2. FIG. 14 is a sectional view taken along the line XIV-XIV indicated by arrows in FIG. 13.

Figure 15:
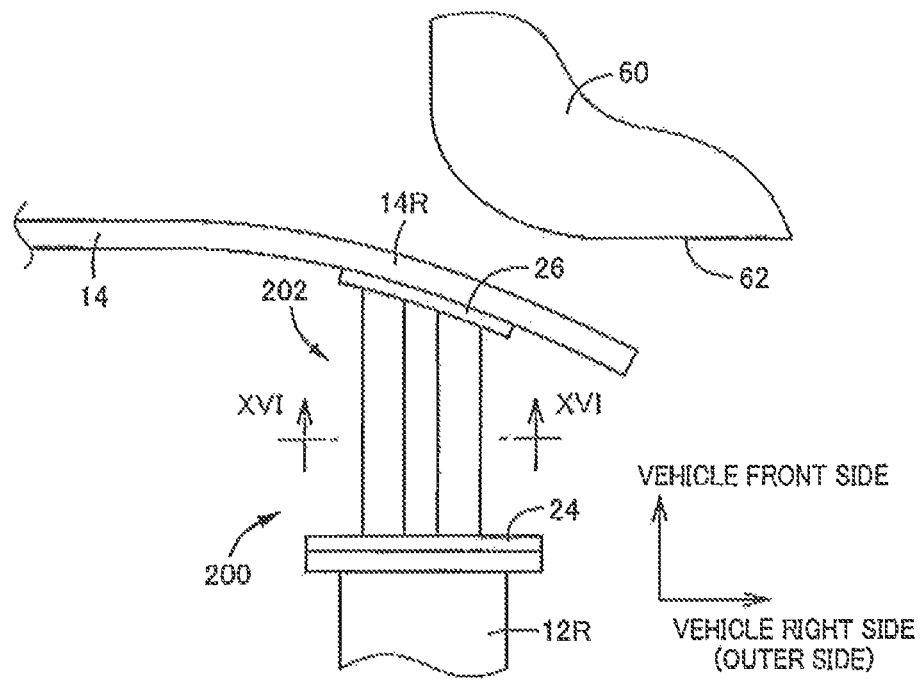
FIG. 15 illustrates the conventional crush box which was used in the offset collision test in FIG. 5, and is a plan view illustrating a location of the crush box and the collision barrier corresponding to FIG. 6.
Figure 16:
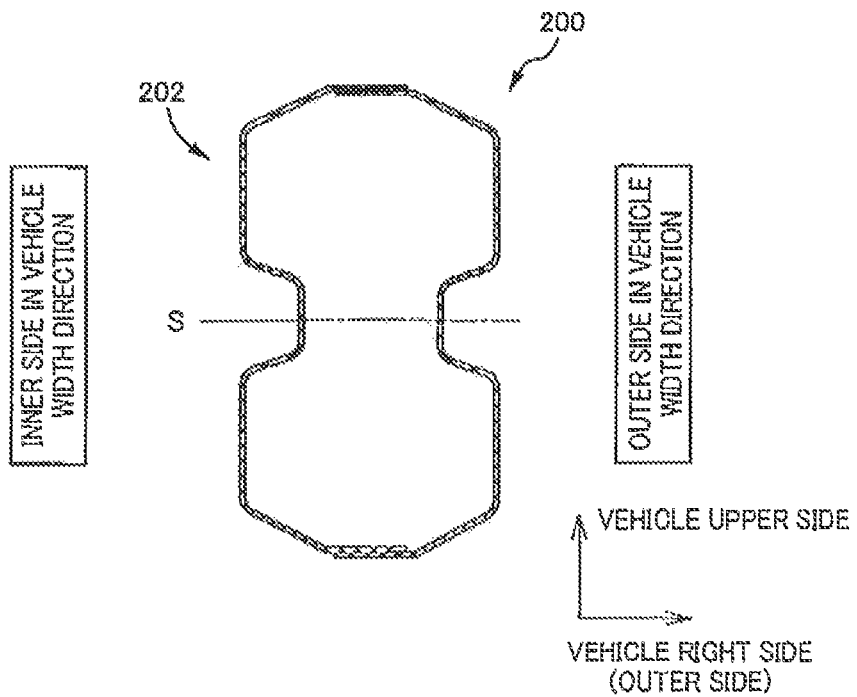
FIG. 16 is a sectional view in a vertical direction to axial direction of the conventional crush box in FIG. 15, i.e. a sectional view taken along the line XVI-XVI indicated by arrows in FIG. 15.

The conventional crush box is a crush box 200 illustrated in FIG. 15 and FIG. 16, which has a tubular body 202 having a flattened octagonal section that is constant over the axial entire length of the tubular body 202. The crush box 200 is disposed between the right end portion 14R of the bumper beam 14 and the side member 12R in such a posture that the axial direction of the tubular body 202 is parallel to the vehicle longitudinal direction. FIG. 15 is a plan view corresponding to FIG. 6. FIG. 16 is a sectional view taken along the line XVI-XVI indicated by arrows in FIG. 15.

As is apparent from FIG. 7 to FIG. 9, in the case where the conventional crush box (crush box 200) is used, as the end portion of the bumper beam 14 undergoes bending deformation, the crush box 200 itself is displaced to tilt inward in the vehicle-width direction from its root (its end portion on the vehicle body side), so that the load borne by the crush box 200 is low in the entire range of the compression stroke and thus the absorbed energy is small. The absorbed energy corresponds to the integral of the loads borne by the crush box 200. In contrast to this, the invented crush boxes I to IV are each crushed into a bellows shape in the substantially entire range of the compression stroke, so that the absorbed energy is large. As a result, high impact energy absorption performance is obtained. Especially, the invented crush box I (crush box 10) and the invented crush box II (crush box 70) each delivers stable impact energy absorption performance in the entire range of the compression stroke because variations in the load are relatively small. In other words, preferably, the width of each of the upper side wall 32 and the lower side wall 33 is increased in the direction toward the bumper beam 14 so that the width of each of the outer inclined side walls 34, 35 is constant, and the depth d1 of the groove 44 of the outer side wall 30 is set to a large value. The invented crush box II (crush box 70) having the intermediate wall 72 delivers higher impact energy absorption performance because the load borne by the crush box 70 is higher than that borne by the invented crush box I (crush box 10) in the entire range of the compression stroke. In the invented crush box III (crush box 80) in which the depth d1 of the groove 44 is relatively small, and the invented crush box IV (crush box 90) in which the width of each of the outer inclined side walls 34, 35 is increased in the direction toward the bumper beam 14, the load borne by the crush box is decreased at an intermediate part of the compression stroke, but is then increased again. As a result, the invented crush box III (crush box 80) and the invented crush box IV (crush box 90) each deliver high impact energy absorption performance as a whole.

Figure 17:
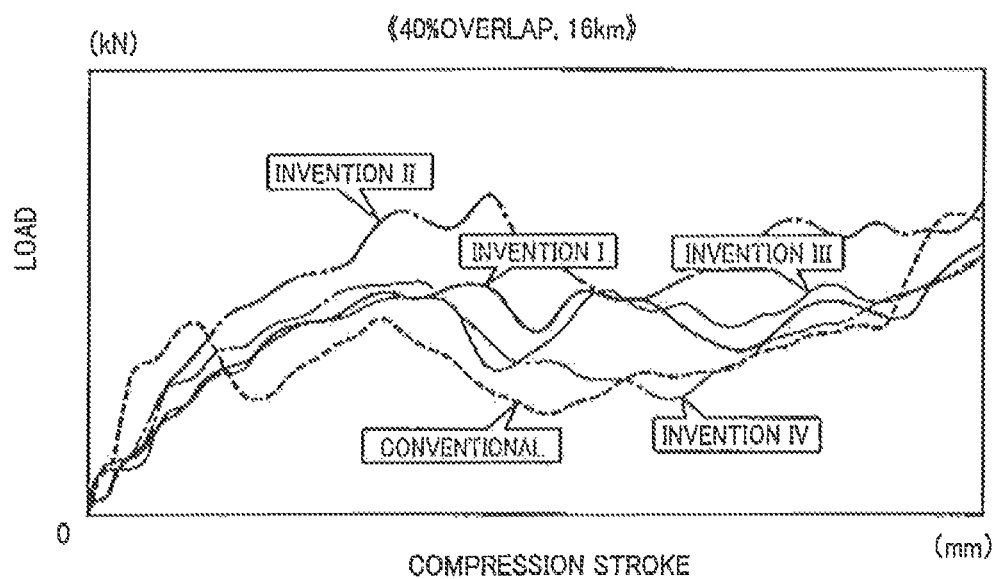
FIG. 17 illustrates load variation characteristics with respect to a compression stroke, which were obtained through FEM analyses after conducting offset collision tests in which the invented crush box and the conventional crush box are used, and the collision barrier collided with part of the crush box with a 40% overlap, larger than the overlap in FIG. 5, and 10° of a barrier angle γ.
Figure 18:
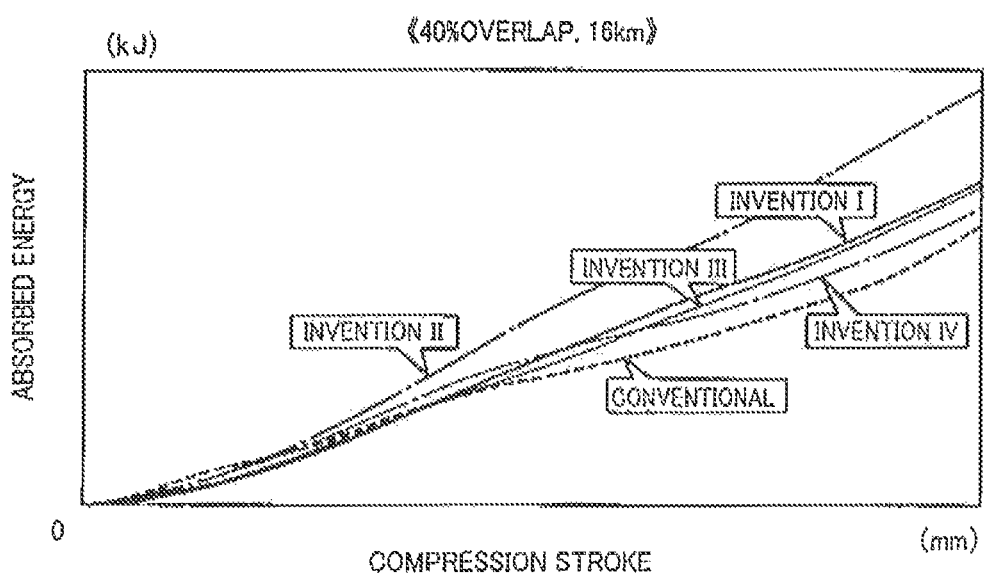
FIG. 18 illustrates impact energy absorption performance which was obtained through the load variation characteristics in FIG. 17.
Figure 20:
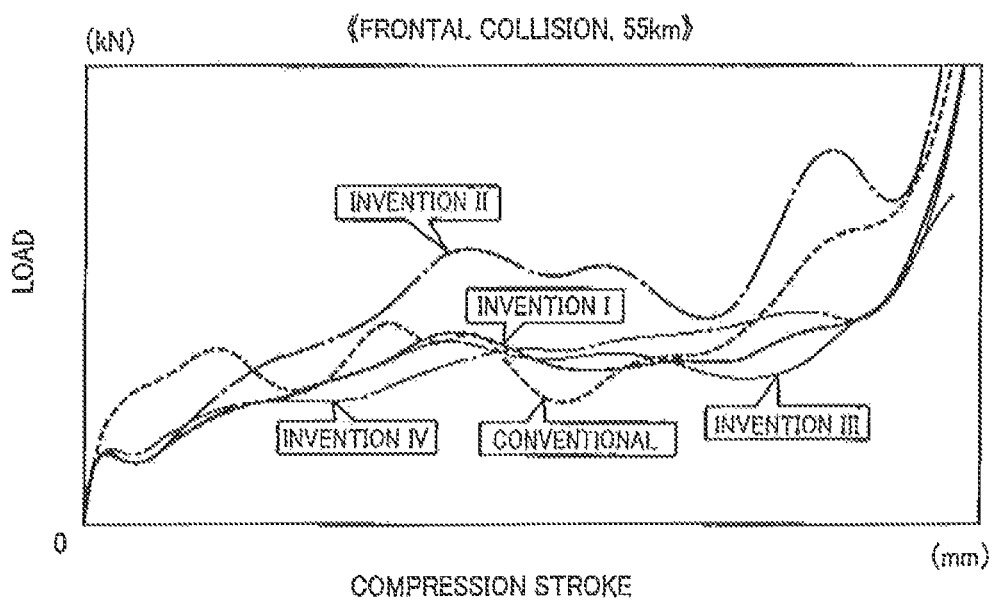
FIG. 20 illustrates load variation characteristics with respect to a compression stroke, which were obtained through FEM analyses after conducting a frontage collision test for the invented crush box and conventional crush box.
Figure 21:
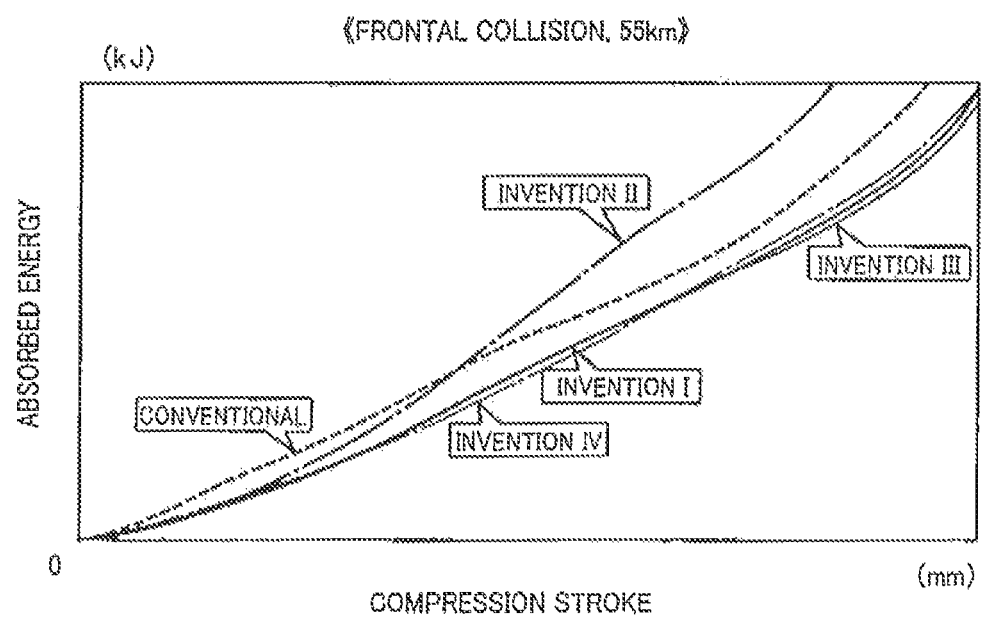
FIG. 21 illustrates impact energy absorption performance which was obtained through load the variation characteristics in FIG. 20.

FIG. 17 to FIG. 19 illustrate the results of offset collision tests in which the above-described five kinds of test parts were used, and the collision barrier 60 collided with part of the crush box with a 40% overlap between the collision barrier 60 and the bumper beam 14. In this case, the barrier angle γ was approximately 10° ($\gamma \approx 10°$), and the vehicle speed V1 was approximately 16 km/h (V1≈16 km/h). FIG. 17 to FIG. 19 correspond to FIG. 7 to FIG. 9, respectively. FIG. 20 to FIG. 22 illustrate the results of frontal collision tests in which the above-described five kinds of test parts were used. In this case, the barrier angle γ was approximately 0° ($\gamma \approx 0°$), and the vehicle speed V1 was approximately 55 km/h (V1≈55 km/h). FIG. 20 to FIG. 22 correspond to FIG. 7 to FIG. 9, respectively. In these cases, variations in the load with respect to the compression stroke were large as a whole. However, the test parts including the conventional crush box were crushed into a bellows shape without being displaced to tilt laterally, and no significant difference was found in the impact energy absorption performance between the invented crush boxes I to IV and the conventional crush box. In other words, each of the invented crush boxes I to IV, in which both the outer side wall 30 and the inner side wall 31 are inclined outward in the vehicle-width direction in the direction toward the bumper beam 14 and the angle of inclination θ1 of the outer side wall 30 is greater than the angle of inclination θ2 of the inner side wall 31, delivers impact energy absorption performance equal to or higher than that of the conventional crush box in both the offset collision test in which an overlap between the collision barrier 60 and the bumper beam 14 is 40% and the frontal collision test.

In each of the crush boxes 10, 70, 80, 90 (invented crush boxes I to IV) according to the embodiments described above, the angle of inclination θ1 of the outer side wall 30 is greater than the angle of inclination θ2 of the inner side wall 31, and thus the width of the crush box increases so as to be widened outward in the vehicle-width direction, in the direction toward the bumper beam 14. Thus, bending deformation of the end portion of the bumper beam 14 is suppressed even in the event of a short overlap offset collision. As a result, each of the crush boxes 10, 70, 80, 90 is restrained from being displaced to tilt laterally and the tubular body 22 is crushed into a bellows shape, so that appropriate impact energy absorption performance is obtained. Because the angle of inclination θ2 of the inner side wall 31 is small and thus the attachment width along which the crush box is attached to the bumper beam 14 is large, the possibility that each of the crush boxes 10, 70, 80, 90 will be displaced to tilt outward in the vehicle-width direction is lowered. As a result, the tubular body 22 is restrained from being displaced to tilt laterally in the event of various kinds of collisions, and prescribed impact energy absorption performance is stably obtained.

The attachment width along which the crush box is attached to the side member 12R is smaller than the attachment width along which the crush box is attached to the bumper beam 14. Thus, an increase in weight of the crush box is smaller than that when the width of tubular body 22 is increased over the entire length of the tubular body 22. Further, it is possible to attach the crush box to the side member 12R without the need to change the side member 12R. Thus, each of the crush boxes according to the embodiments described above is easily applicable to conventional vehicles.

In each of the crush boxes 10, 70, 80 (the invented crush boxes I to III), the tubular body 22 has an octagonal section and each of the outer inclined side walls 34, is formed to have a constant width so that the ridge lines 40, 41 between the outer inclined side walls 34, 35 and the upper and lower side walls 32, 33 are parallel to the outer side wall 30. Thus, the width of each of the upper side wall 32 and the lower side wall 33 increases in the direction toward the bumper beam 14 in accordance with the inclination of the outer side wall 30 outward in the vehicle-width direction. With this configuration, appropriate strength is obtained in spite of the large inclination of the outer side wall 30, and the impact energy absorption performance is improved.

In each of the crush boxes 10, 70, 90 (the invented crush boxes I, II, IV), the grooves 44, 45 are respectively formed in the outer side wall 30 and the inner side wall 31, and the depth d1 of the groove 44 of the outer side wall 30 is greater than the depth d2 of the groove 45 of the inner side wall 31. Thus, the buckling strength of the outer side wall 30 increases, and appropriate impact energy absorption performance is obtained in spite of the large inclination.

In the crush box 70 (the invented crush box II), the intermediate wall 72 that connects the upper side wall 32 and the lower side wall 33 to each other is disposed over the entire length of the tubular body 22, and the groove 74 is formed in the intermediate wall 72. Thus, the buckling strength of the tubular body 22 increases, and appropriate impact energy absorption performance is obtained.

Figure 23:
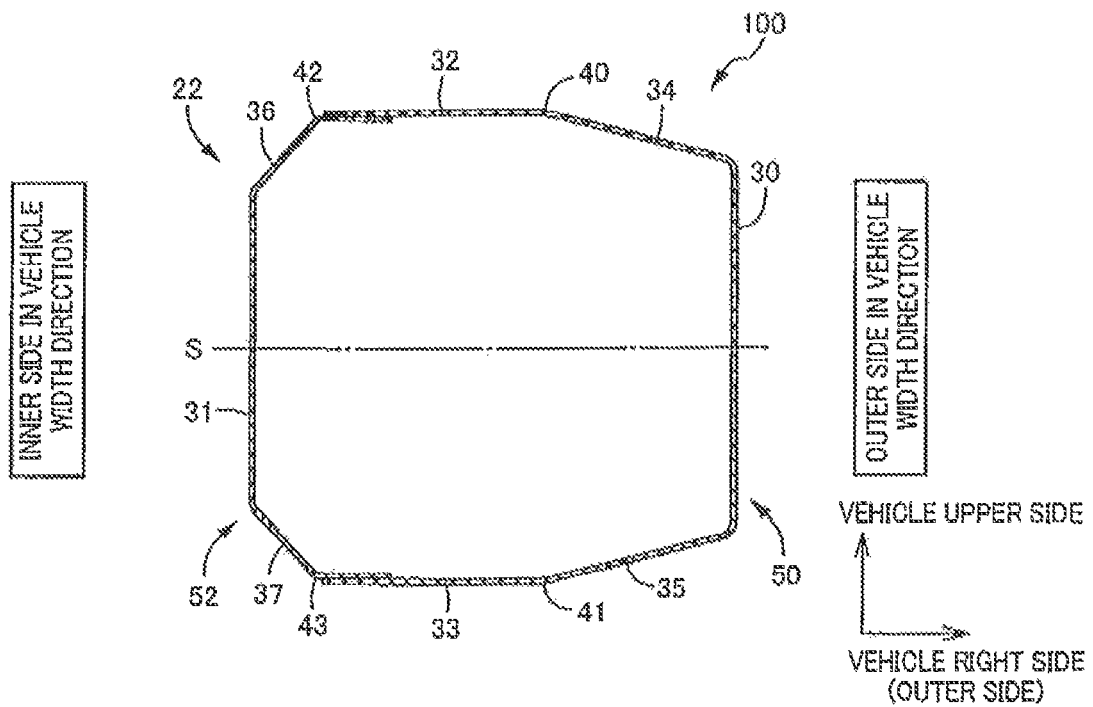
FIG. 23 is a sectional view corresponding to FIG. 3, and illustrates further embodiment.
Figure 24:
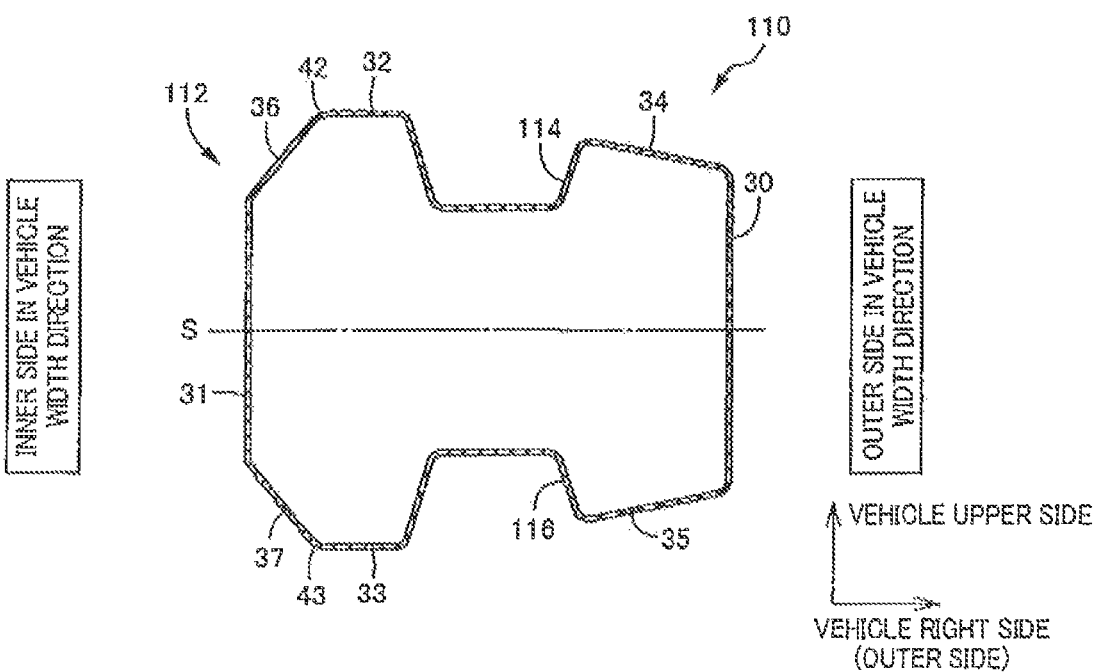
FIG. 24 is a sectional view corresponding to FIG. 3, and illustrates furthermore embodiment.

The grooves 44, 45 or the grooves 82, 45 are formed in the outer side wall 30 and the inner side wall 31 in the embodiments described above. However, as illustrated in FIG. 23, a crush box 100 having a simple polygonal section with no grooves may be adopted. Alternatively, as illustrated in FIG. 24, a crush box 110 in which grooves 114, 116 are respectively formed at the boundary between the upper side wall 32 and the outer inclined side wall 34 and at the between the lower side wall 33 and the outer inclined side wall 35 may be adopted. That is, the invention may be implemented in various embodiments. In the crush box 110 illustrated in FIG. 24, the tubular body 112 is formed of a thin-walled pipe, fiber-reinforced plastic, or the like, as a single-piece member. FIG. 23 and FIG. 24 are sectional views corresponding to FIG. 3.

The embodiments of the invention have been described above in detail with reference to the attached drawings, but each of these embodiments is merely one embodiment, and the invention may be implemented in various modes achieved by making various changes and improvements based on the knowledge of a person skilled in the art.

NOMENCLATURE OF ELEMENTS

10, 70, 80, 90, 100, 110: crush box 12R: side member (vehicle body) 14: bumper beam 22, 112: tubular body 30: outer side wall 31: inner side wall 32: upper side wall 33: lower side wall 34, 35: outer inclined side wall 36, 37: inner inclined side wall 40, 41: ridge line 44, 45: groove $\theta_1$, $\theta_2$: angle of inclination d1, d2: depth

What is claimed is:

1. A crush box comprising a tubular body having a polygonal section and being disposed between an end portion of a bumper beam and a vehicle body in such a posture that an axial direction of the tubular body generally coincides with a longitudinal direction of a vehicle, wherein the tubular body has an outer side wall and an inner side wall that is located inward of the outer side wail in a vehicle-width direction, wherein both the outer side wall and the inner side wall are inclined to the axial direction of the tubular body so as to be positioned outward in the vehicle-width direction as the tubular body extends from the vehicle body toward the bumper beam in a planar view as viewed from an up-down direction of the crush box, wherein the tubular body is crushed into a bellows shape to absorb impact energy as a compressive load is applied to the tubular body from the bumper beam in the axial direction of the tubular body, and wherein an angle of inclination of the outer side wall is greater than an angle of inclination of the inner side wall.

2. The crush box according to claim 1, wherein:

the tubular body has an octagonal shape in a section perpendicular to the longitudinal direction of the vehicle;

the tubular body has a top wall and bottom wall wall in addition to the outer side wall and the inner side wall;

the tubular body has an outer inclined side wall disposed between the top wall and the outer side wall, and an outer inclined side wall disposed between the bottom wall and the outer side wall;

the tubular body has an inner inclined side wall disposed between the top wall and the inner side wall, and an inner inclined side wall disposed between the bottom wall and the inner side wall; and each of the outer inclined side walls is formed to have a constant width so that a ridge line between the top wall and a corresponding one of the outer inclined side walls and a ridge line between the bottom wall and a corresponding one of the outer inclined side walls are parallel to the outer side wall in the planer view as viewed from the up-down direction of the crush box.

3. The crush box according to claim 1, wherein:

grooves that are recessed toward an inside of the tubular body are respectively formed in the outer side wall and the inner side wall so as to extend in the axial direction of the tubular body; and a depth of the groove of the outer side wall is greater than a depth of the groove of the inner side wall.

4. The crush box according to claim 1, wherein:

the end portion of the bumper beam is inclined so as to approach the vehicle body; and at least part of a bumper beam-side end portion of the tubular body is inclined so as to be attached to the inclined end portion of the bumper beam.

* * * * *